United States Patent [19]

Smithers

[11] 4,023,232
[45] May 17, 1977

[54] WINDSCREEN WIPERS

[76] Inventor: Philip G. K. Smithers, 3 Penwerris Ave., Osterley, Hounslow, Middlesex, England

[22] Filed: May 28, 1976

[21] Appl. No.: 690,834

[30] Foreign Application Priority Data

May 31, 1975 United Kingdom ............ 23738/75

[52] U.S. Cl. ........................................... 15/250.32
[51] Int. Cl.² ......................................... B60S 1/40
[58] Field of Search ................ 15/250.32–250.42

[56] References Cited

UNITED STATES PATENTS

| 3,843,994 | 10/1974 | Smithers | 15/250.32 |
| 3,896,519 | 7/1975 | Pankow | 15/250.32 |
| 3,919,735 | 11/1975 | Arman | 15/250.32 |

FOREIGN PATENTS OR APPLICATIONS

| 2,310,374 | 9/1974 | Germany | 15/250.32 |

Primary Examiner—Peter Feldman
Attorney, Agent, or Firm—E. Herbert Liss

[57] ABSTRACT

A side mounting wiper blade is attached to a "shepherd's crook" wiper arm by means of an adaptor. The adaptor comprises a body shaped to fit against the arm and to receive the lateral pin of the wiper blade, and a single releasable latch member serving to lock the body to the pin and to the arm.

6 Claims, 8 Drawing Figures

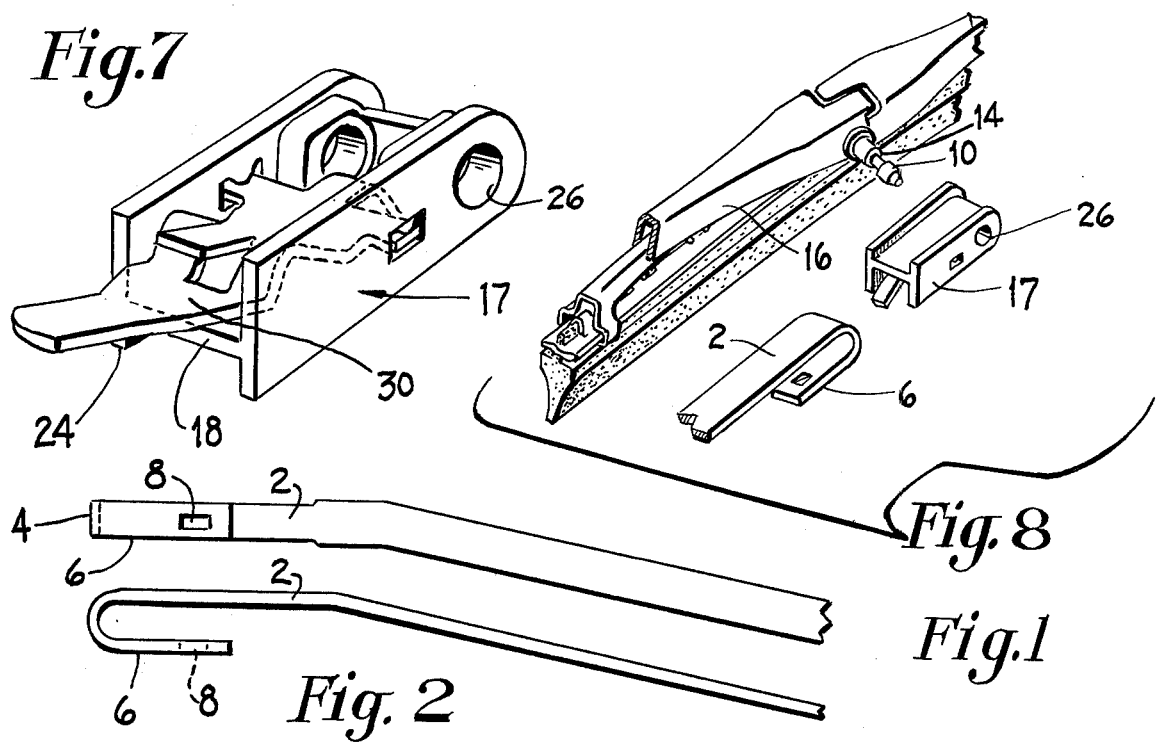
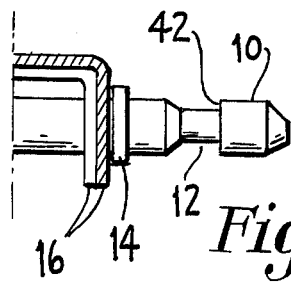
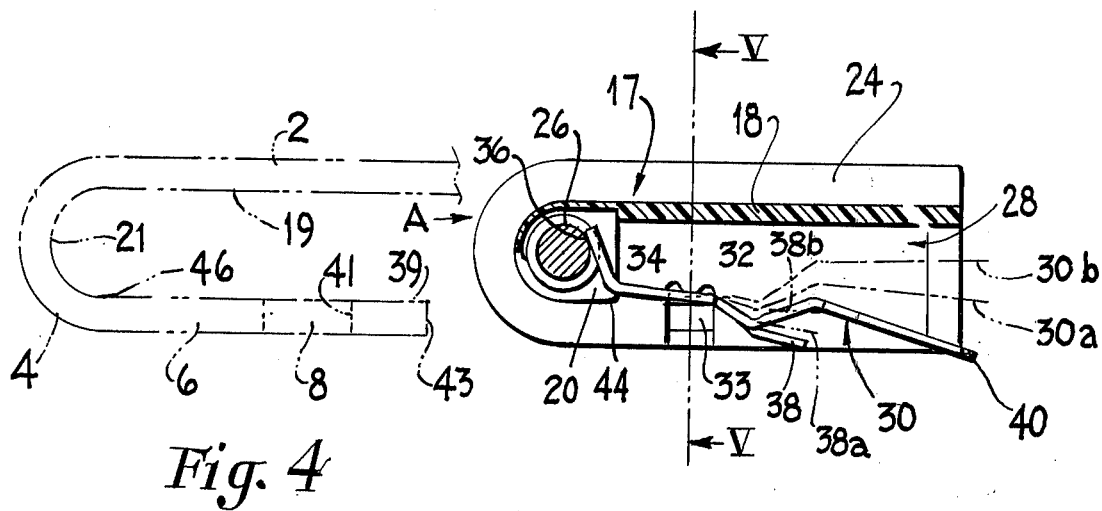

WINDSCREEN WIPERS

BACKGROUND OF THE INVENTION

This invention relates to adaptors for attachment of windscreen wiper blades to wiper arms and in particular to adaptors which allow side-mounting blades to be used with wiper arms of the "shepherd's crook" kind.

Such an arm has an outer portion formed of bar and comprising, in succession, a straight main part, a part curved into semicircular shape, and a short straight terminal part, parallel to and spaced from a lower face of the main part. A known type of sidemounting wiper blade includes a circumferentially grooved mounting pin, extending from a side of the blade, and lying in use approximately parallel to the windscreen being wiped.

"Shepherd's crook" arms are widely in use on existing cars, in conjunction with the wiper blades which are not of the sidemounting kind. It is advantageous to a user of such a car to be able to replace an existing wiper blade by a side-mounting blade, because it is recognized that a side-mounting blade gives a superior performance as compared with older kinds of blades. However, present blades for "shepherd's crook" arms are equipped with a special arm to blade connector for retaining the blade on a "shepherd's crook" arm. These connectors are mounted in a straddling relationship to the harness and extend above the harness's silhouette. Side mounting blades carrying a grooved pin are accomodated by special arms which carry a receptor for the pin. Thus at present there is no interchangeability or compatibility between "shepherd's crook" arms and side mounting blades. It has not been possible for a car equipped with a "shepherd's crook" arm to obtain the advantages achieved in side mounting as for example a low silhouette arrangement which is more resistant to windlift among other advantages.

The unique adaptor of the present invention provides for use of a blade with a grooved pin type connector which can be side mounted on a "shepherd's crook" type arm which includes a latching element on the terminal part. This is achieved by an adaptor which comprises a body including a web with a flat upper surface terminating in a semi-cylindrical end portion depending therefrom; the semi-cylindrical end portion merges into a flat lower surface. The semi-cylindrical end portion is formed of collar-like portions which are spaced apart to accomodate one end of a resilient latch member therebetween. The web and cylindrical end portion have outwardly extending flanges in a plane perpendicular to the plane of the web portion at each longitudinal edge. The flanges extend radially outward from the cylindrical end portion. A bore extends transversely through the flanges and the cylindrical end portions to accomodate the grooved pin of the side mounting blade. The one end portion of the resilient latch intersects the bore to engage the groove of the pin on the wiper blade to retain it in assembled condition. Adjacent the other end of the latch member is an element which cooperates with the latching member on theterminal part of the "shepherd's crook" arm. The straight main part of the arm is accomodated between the flanges and against the flat upper surface of the web of the adaptor. The curved part is accomodated by the semi-cylindrical portion of the adaptor and the terminal part by the underlying straight portion thereof. The latch element adjacent the other end of the resilient latch member engages the latching element in the terminal part of the arm to retain the adaptor in assembled condition to the arm.

Accordingly it is an object of this invention to provide an adaptor for a windscreen wiper assembly which permits the use of a side mounting blade with a "shepherd's crook" arm.

It is another object of the invention to provide an adaptor for a windscreen wiper assembly which is simple and readily useable without tools and which provides for use of a side mounting wiper blade with a "shepherd's crook" arm and which renders the blade readily removable and replaceable.

Other objects and advantages of the invention will be apparent from the detailed description taken in connection with the accompanying drawings.

BRIEF DESCRIPTION OF THE DRAWINGS

FIG. 1 is a fragmentary bottom elevational view of a wiper arm;

FIG. 2 is a side elevation of the arm shown in FIG. 1;

FIG. 3 is an elevation of a mounting pin with a fragmentary transverse section of a wiper blade harness;

FIG. 4 is a longitudinal vertical section of an adaptor taken on the line IV—IV of FIG. 5;

FIG. 7 is a perspective view of the adaptor with the bottom side up; and

FIG. 8 is an exploded perspective view of the assembly incorporating the adaptor of this invention.

FIGS. 1 and 2 show a "shepherd's crook" wiper arm, including a main part 2, a semi-circular part 4, and a short straight terminal part 6, in which is a rectangular hole 8.

FIG. 3 shows a mounting pin 10 having a circumferential groove 12 and a circumferential collar 14. The pin extends (to the left as seen in FIGS. 3 and 8) beyond the collar 14, so as to act as a pivot between levers or yokes which constitute the harness of a wiper blade, and which are only indicated at 16 as the particular details of them constitute no part of the present invention.

Figure 5:
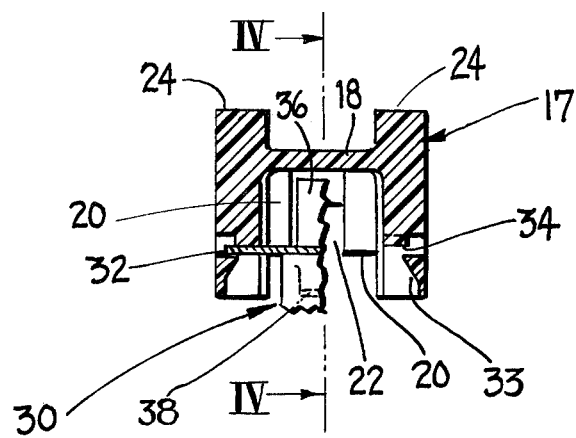
FIG. 5 is a transverse section on the line V—V of FIG. 4.

The adaptor, shown in FIGS. 4 to 8, has a body 17 consisting of a substantially rigid web 18 and two collar-like portions 20, between which is a gap 22. When the adaptor is assembled with the arm, the web 18 fits against the lower face 19 of the main part 2, and the collars 20 fit against the inside face 21 of the part 4, and against the immediately adjacent opposed faces 46, 19 of the terminal part 6 of the main part 2.

At each side of the adaptor there is a flange 24. In the assembled condition, these flanges fit against the sides of the arm, as is apparent from considering FIG. 4, where the arm is shown in chain lines in a position from which it can reach assembled condition with the adaptor by relative movement as indicated by the arrow A.

A bore 26 passes through each flange 24 and each collar 20. In the assembled condition, the mounting pin 10 is inserted into the bore until the collar 14 abuts an adjacent one of the flanges 24, as is apparent from considering FIG. 6, where the pin is shown in chain lines in a position from which it can reach assembled condition with the adaptor by relative movement as indicated by the arrow B.

The web 18 and the flanges 24 define a recess 28 within the body, which serves to accomodate the resilient latch member 30. The body 17 of the adaptor can be an integral molding of a plastics material, e.g., acetal resin as shown or any suitable or desirable material. The latch member 30 can be stamped from sheet metal, e.g., stainless steel or spring steel.

The latch member is pivoted to the body by two lugs 32 on the latch member which lie in holes 34 in the flanges 24. The pivotal axis thus defined is parallel to the axis of the bore 26. Although the body is substantially rigid, the flanges 24 can be displaced apart during manufacture of the adaptor, by pressing the lugs 32 against inclined surfaces 33, to enable the latch member to attain the position shown.

The latch member includes a first latching element comprising a tongue 36, which lies in the space 22 between the collars 20. The latch member also includes a second latching element comprising a tongue 38 struck downwards out of the latch member.

Figure 6:
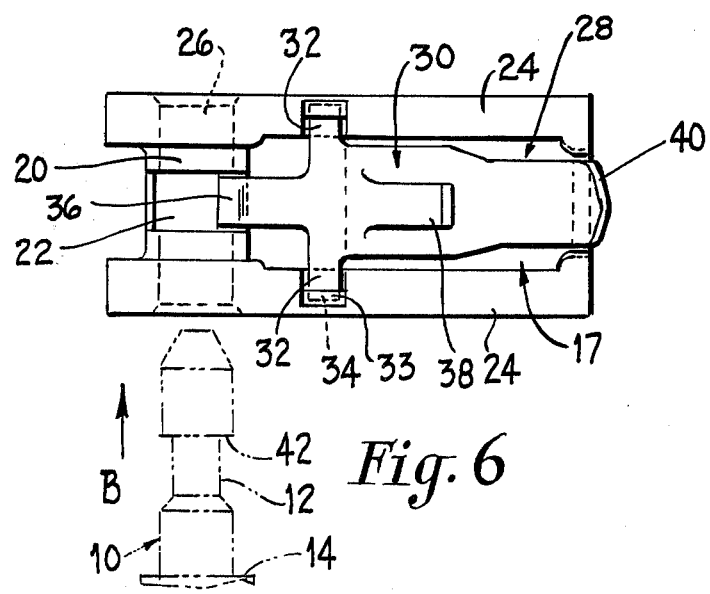
FIG. 6 is a bottom elevational view of the adaptor.

When the adaptor is to be assembled with a wiper arm and wiper blade, the first step is to insert the mounting pin 10 as far as possible into the bore 26 by movement in the direction of the arrow B in FIG. 6. The second step is to assemble the adaptor with the wiper arm, the final movement of the arm relative to the adaptor being in the direction of the arrow A in FIG. 4. During the last part of this movement, the tongue 38 rides over the upper surface 39 of the terminal part 6 of the arm, until the tongue 38 is aligned with the hole 8. Thereupon the resilience of the latch member causes the tongue 38 to shift downwards into the hole 8, and the free end of the tongue 38 abuts a wall 41 of the hole 8, this wall 41 constituting the latching element of the terminal part 6. The position of the latch member 30, with its tongue 38, in this assembled condition is indicated by chain lines 30a, 38a in FIG. 4. The presence of the mounting pin in the bore 26 prevents movement of the tongue 36 to the left, and hence prevents the latch member 30 from rotating bodily in an anti-clockwise direction (as seen in FIG. 4) relative to the body 17 of the adaptor. Consequently, the tongue 38 can only be disengaged from the hole 8 by manual upward pressure on the free end 40 of the latch member, which extends beyond the free end 43 of the terminal part 6 of the arm, so as to be accessible to a user.

The proportions of the latch member and of the body, and the angle between the tongue 36 and the remainder of the latch member (an angle of about 80° in the example shown), are such that, in the assembled condition, the tongue 36 lies within the circumferential groove 12 in the mounting pin 10, and hence cooperates with a shoulder 42 defining one boundary of the groove, and thereby prevents withdrawal of the mounting pin 10 from the adaptor.

In order to separate the adaptor from the wiper blade and wiper arm, it is first necessary to press upwards on the free end 40 of the latch member. The upward pressure must shift the latch member 30 and its tongue 38 to the position indicated by chain lines 30b, and 38b in FIG. 4, whereupon the arm and the adaptor can be separated by relative movement the reverse of that indicated by the arrow A in FIG. 4. After this has been done, the latch member can bodily tilt in a clockwise direction (as seen in FIG. 4) to a sufficient extent to disengage the tongue 36 from the circumferential groove 12, whereupon the mounting pin 10 can be withdrawn from the bore 26.

In the example shown, considering FIG. 4, each collar 20 has a flat surface 44 below and to the right of the bore 26. This surface cooperates with the upper surface 46 of the terminal part 6 to prevent rotation of the adaptor body relative to the arm. In this way, the lugs 32 are protected from any possibility of being overstressed during use. However, such a flat surface 44 is not essential.

It can be seen that a simple, readily useable adaptor for accomodating a side mounting wiper blade on a "shepherd's crook" arm has been provided. Although a specific embodiment of the invention has been shown and described for the purpose of illustration it will of course be apparent that various modifications are possible within the scope of the invention. For example there are a number of "shepherd's crook" wiper arms in existence which differ from one another in dimensions and also in the nature of the latching element on the terminal part. The invention contemplates the adaptor being made to suit a particular arm. For example in place of the hole 8 the arm may have a notch in one side of the short straight terminal part 6 of the arm, or a pair of exposed notches, one at each side of the terminal part 6. For such cases the latch member 30 may be replaced by a latch member which, instead of having a tongue 38, has a downwardly directed lug on one side, or a pair of such lugs, one on each side of the latch member. It is to be understood therefore that the invention is not limited to the specific arrangement shown but in its broadest aspects it includes all equivalent embodiments and modifications which come within the scope of the invention.

What is claimed is:

1. In a windscreen wiper arm and blade assembly comprising a wiper blade including a circumferentially grooved mounting pin extending from a side of the blade, defining a shoulder near the end of said pin, a wiper arm having an outer portion formed of a bar and comprising, in succession, a straight main part, a part curved into a semi-circular shape, and a short straight terminal part, parallel to and spaced from a lower face of the main part, the terminal part including a latching element; the improvement comprising an adaptor for securing the arm to the blade, the adaptor comprising a body and a resilient latch member lying at least mainly within the body, the body having surfaces to fit against and substantially conform to the inside curved part of the arm and against the lower face of the main part of the arm, flanges to fit against the side edges of the arm, and a bore to receive the mounting pin, the latch member being pivoted to the body about an axis parallel to the bore, and having a first latching element which is engageable in the groove in the pin of the wiper blade, a second latching element engageable with the latching element of the terminal part of the arm and an actuating element said first latching element extending into said groove and cooperating with said shoulder, thereby preventing withdrawal of said pin from said adaptor.

2. Apparatus as claimed in claim 1, wherein said body comprises a web member having a flat surface terminating in a pair of spaced apart depending semi-cylindrical collar-like members, said bore extending transversely through said flanges and said collar-like members.

3. Apparatus as claimed in claim 1, wherein said first and second latching elements are disposed on a single resilient latching member, said latching member being disposed between said flanges below said web member pivoted to said web member on an axis intermediate said first and second latch elements.

4. Apparatus as claimed in claim 3 wherein said first latch element extends between said collar-like members and intersects said bore.

5. Apparatus as claimed in claim 4 wherein said resilient latching member includes an actuating element accessible to the user.

6. Apparatus as claimed in claim 4 wherein said first latch element is positioned to resiliently engage said groove in said pin to thereby resiliently urge said latch member to rotate on said pivotal axis to cause said second latch element to resiliently engage said latch member on said terminal part of said arm when in assembled condition.

* * * * *